United States Patent [19]

Clark

[11] Patent Number: 4,625,302

[45] Date of Patent: Nov. 25, 1986

[54] ACOUSTIC LENS FOR MARINE SEISMIC DATA MULTIPLE REFLECTION NOISE REDUCTION

[75] Inventor: William H. Clark, Calgary, Canada

[73] Assignee: Exxon Production Research Co., Houston, Tex.

[21] Appl. No.: 544,666

[22] Filed: Oct. 24, 1983

[51] Int. Cl.[4] .............................................. G01V 1/38
[52] U.S. Cl. ...................................... 367/24; 181/110
[58] Field of Search ....................... 367/24, 16, 21, 20; 181/110, 112

[56] References Cited

U.S. PATENT DOCUMENTS

| | | |
|---|---|---|
| 2,757,356 | 7/1956 | Haggerty . |
| 2,954,090 | 9/1960 | Burg et al. .......................... 181/110 |
| 3,943,484 | 3/1976 | Balderson . |
| 4,087,780 | 5/1978 | Itria et al. .............................. 367/19 |
| 4,397,006 | 8/1983 | Galbraith, Jr. ......................... 367/40 |

FOREIGN PATENT DOCUMENTS

| | | |
|---|---|---|
| 1149925 | 7/1983 | Canada . |
| 1376513 | 12/1974 | United Kingdom .................. 367/24 |
| 2136568A | 9/1984 | United Kingdom . |

OTHER PUBLICATIONS

Edward Silberman, "Sound Velocity and Attenuation in Bubbly Mixures Measured in Standing Wave Tubes", The Acoustical Society of America, vol. 29, No. 6, pp. 925–953, Aug. 1957.

F. E. Fox, S. R. Curley, G. S. Larson, "Phase Velocity and Absorption Measurements in Water Containing Air Bubbles", The Acoustical Society of America, vol. 27, No. 3, pp. 534–539, May 1955.

*Primary Examiner*—Thomas H. Tarcza
*Assistant Examiner*—Ian J. Lobo
*Attorney, Agent, or Firm*—Alfred A. Equitz

[57] ABSTRACT

An improved method and apparatus for gathering seismic data in a region covered by a body of water. Gas bubbles are formed in a zone of water adjacent a streamer containing hydrophones to form an acoustic lens for refracting acoustic waves which have reflected from the sea floor or subfloor geologic structures. This zone reduces the amount of noise at the hydrophones due to multiple reflections of sound between the water surface and floor. In the preferred embodiment, a pair of perforated gas dispensing tubes are towed from a seismic vessel. The tubes are maintained in a fixed position relative to the streamer generally above and on opposite sides of the streamer by a pair of paravanes, one attached to each tube. A gas compressing means aboard the vessel supplies gas to the tubes. The gas then escapes through the perforations in the tubes to form the zone.

3 Claims, 3 Drawing Figures

ACOUSTIC LENS FOR MARINE SEISMIC DATA MULTIPLE REFLECTION NOISE REDUCTION

FIELD OF THE INVENTION

The invention relates to a method and apparatus for reducing multiple reflection noise associated with data collected during marine seismic exploration. More particularly, the invention relates to a method and apparatus for injecting gas bubbles into a region of water adjacent to a seismic streamer in order to reduce the amount of noise at the hydrophones of the streamer due to multiple reflections of sound between the water surface and floor.

BACKGROUND OF THE INVENTION

In exploring in subsea and other areas underlying a body of water, it is desirable to provide a source of energy for propagating acoustic pulses into the water. Since water is a good conductor of sound, it normally is not necessary to generate pulses near the floor of the waterbody; they can be, and desirably are, produced near the water's surface. These acoustic pulses propagate down through the water and may be reflected, to some extent, from a reflective horizon back to an array of hydrophones, or like equipment, waiting near the surface of the water. The reflective horizon may be the floor of the waterbody or a subfloor geologic formation. Analysis of the signals produced by the hydrophones can provide some instruction concerning the structure of the subfloor geological formation and attendant petroleum accumulation in those formations.

The term "water" as used herein is meant to include swampwater, mud, marshwater and any other liquid containing sufficient water to enable operation of the invention.

The usual technique for marine seismic exploration involves towing one or more seismic sources and one or more seismic cables (or "streamers") behind an exploration vessel. Each streamer contains arrays of hydrophones which detect acoustic energy generated by the seismic source and reflected from subfloor geological formations. The term "hydrophone" as used herein is meant to include any type of instrument for detecting acoustic waves.

The depth to which subfloor geological formations can be detected depends on, among other variables, the ratio of signal strength to noise level at the hydrophones. In many marine regions, multiple reflections between the water-air interface and either the water-floor interface or a shallow subfloor reflecting surface are a significant source of noise. Multiple reflections are particularly serious if they should happen to reinforce each other so as to set up standing waves between the water-air interface (hereinafter referred to as the "water surface") and the other reflecting surface from which the noise reflects (hereinafter referred to as the "floor"), whether it be the water-floor interface or a shallow subfloor reflecting surface. These standing waves or "acoustic reverberations" (occasionally called "ringing") in the water may produce multiple reflections extending almost the entire length of seismograms produced during seismic exploration operations, to a distance beyond that at which it is expected that useful reflection information will be obtained. As a result, the relatively weak reflection events from deeper reflection horizons may be completely obscured by the multiple reflections.

Various schemes have been proposed for reducing such reverberating noise. One such scheme is disclosed in U.S. Pat. No. 3,943,484, issued Mar. 9, 1976 to Balderson. Balderson discloses positioning both the seismic source and hydrophones at a depth chosen so that undesirable reflections from the water surface and the water floor will arrive at the hydrophones substantially 180° out of phase, and will thus cancel. U.S. Pat. No. 2,757,356, issued July 31, 1956 to Haggerty, discloses a similar scheme. Haggerty discloses towing at least two streamers, containing hydrophones, separated by a distance selected so that reverberating acoustic noise in the nature of standing waves detected at one streamer will be substantially 180° out of phase from the noise detected at another streamer, and then combining the signals detected at such streamers to reduce or cancel the reverberating noise. Significant practical difficulties must be overcome to practice the invention of Balderson or that of Haggerty. Both require that the distance between the water surface and the water floor be known in each region to be explored, in order to select the depth or depths at which the hydrophones are to be towed. Such distance may vary substantially in the region to be explored. Both also require that the hydrophones be maintained in position at the selected depth or depths, which selected depth or depths may vary substantially with the position of the seismic vessel as it moves through the region to be explored.

United Kingdom Pat. No. 1,376,513, granted to Imperial Chemical Industries Limited and published Dec. 4, 1974, discloses a scheme for reducing noise at a seismic streamer due to reflections from the water surface of acoustic waves proceeding up toward the water surface from a submerged explosive charge. The U.K. Patent discloses disposing a mantle of gas (such as gas bubbles, closed-cell foamed plastic, or a volume of gas entrapped beneath an inverted vessel) between the explosive charge and the water surface.

U.K. Pat. No. 1,376,513 does not specify the position of the mantle relative to the streamer. In typical marine seismic data gathering operations, the streamer and seismic source will be separated by a substantial horizontal distance, so that a gas mantle disposed above the source will be located far from the region above the streamer. Nor does the U.K. Patent specify any particular size or shape for the mantle beyond noting that where a sheet of foamed plastic is used as the mantle, the sheet may be either flat or curved, and where gas entrapped beneath a vessel is used as the mantle, the vessel should be "inverted". The U.K. Patent does not disclose any method or apparatus for reducing reverberating noise at a streamer located a substantial horizontal distance from a source due to acoustic waves which have propagated downward from the source, and then reflected upward from the floor (or a subfloor reflecting layer) and downward from the water surface to be detected by the hydrophones of the streamer. Nor does the U.K. Patent disclose use of a mantle of gas as an acoustic lens for refracting acoustic waves reflected from the water surface or floor to reduce the reverberating noise received by the hydrophones.

SUMMARY OF THE INVENTION

According to the method of the invention, gas bubbles are introduced into a zone of water adjacent a streamer containing hydrophones to form an acoustic lens to refract acoustic waves incident on the water zone and reduce the amount of noise at the hydrophones due to multiple reflections of sound between the water surface and floor. Since the sound velocity in the zone of bubble-containing water is less than the sound velocity in the water outside the zone, an appropriately shaped and sized zone will redirect upward traveling acoustic waves incident on the lens so that their reflections from the surface will not pass through the region near the hydrophones, but instead will be directed laterally away from the hydrophones.

The gas bubbles may be introduced into the zone of water by one or more tubes, each having perforations through its side wall, which are towed behind the seismic vessel. Paravanes may be attached to the tubes to control their position relative to the seismic streamer. Gas compressing means aboard the seismic vessel may be used to supply gas to the tubes. The gas escapes through the perforations to produce a plurality of bubbles in the zone. It is desirable that the mean diameter of the gas bubbles be about 0.1 millimeters. It is preferred that the ratio of the volume of gas bubbles to water in the zone be in excess of about 0.0002 and substantially less than one.

DESCRIPTION OF THE PREFERRED EMBODIMENT

Figure 1:
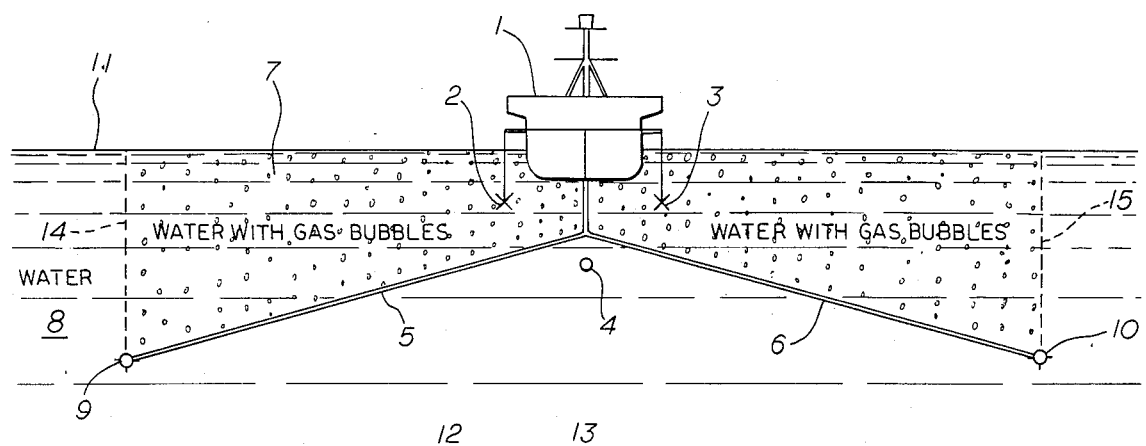
FIG. 1 is a front elevation view of an acoustic lens illustrating the preferred embodiment of the present invention.
Figure 2:
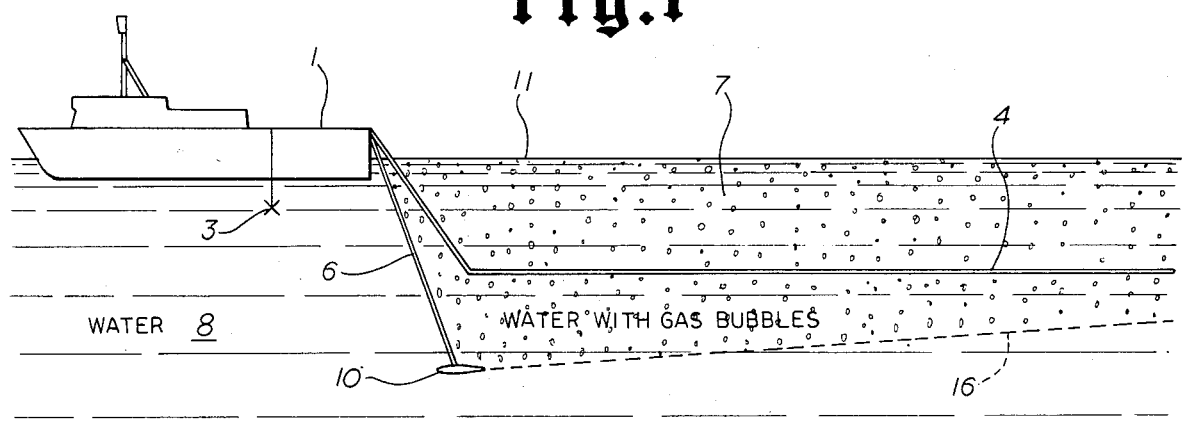
FIG. 2 is a side elevation view of an acoustic lens illustrating the preferred embodiment of the present invention.

The preferred embodiment of the invention may be more easily understood with reference to FIGS. 1 and 2. FIG. 1 is a front elevational view showing the preferred embodiment of the apparatus of the invention. FIG. 2 is a side elevational view of the apparatus shown in FIG. 1. Seismic sources 2 and 3 are towed from the sides of seismic vessel 1. Each seismic source generates an acoustic wave in body of water 8 in response to a firing signal from seismic vessel 1, in a manner well known in the art. Such acoustic waves propagate into subterranean earth formation 13 beneath floor 12 of body of water 8, and are reflected from one or more subfloor reflecting layers (not shown) in earth formation 13. Sources 2 and 3 may also generate acoustic waves which will propagate down to floor 12 and reflect therefrom. Streamer 4 is towed from the rear of seismic vessel 1 and contains one or more hydrophones for detecting the acoustic waves reflected from the subfloor reflecting layers (or "reflective horizons"). A typical streamer may be several kilometers in length and may include several hundred hydrophone arrays, each array consisting of a plurality of hydrophones. For simplicity, the section of streamer 4 nearest seismic vessel 1 is not shown in FIG. 1, though it is shown in FIG. 2.

In many marine regions, a significant source of noise at the hydrophones of streamer 4 is caused by the re-reflections from water surface 11 of the acoustic waves first reflected from floor 12 or from the subfloor reflecting layers. Such re-reflected waves may echo many times between floor 12 and surface 11. These multiple reflections may approach the portion of surface 11 above streamer 4 perpendicularly, and may reinforce each other so as to set up standing waves or "reverberations" (or "ringing") between the floor and surface. Such reverberations are often a particularly troublesome source of noise at the hydrophones.

In order to reduce the amount of ringing noise at the hydrophones, gas dispensing tubes 5 and 6 are towed in body of water 8 from seismic vessel 1. Each gas dispensing tube has perforations through its wall through which bubbles may be introduced into zone 7 of body of water 8. Paravane 10, attached to the end of tube 6, and paravane 9, attached to the end of tube 5, are provided to control the position of tubes 5 and 6 relative to streamer 4 in response to control signals generated aboard seismic vessel 1. Paravanes 9 and 10 may be selected from those commonly used for controlling the lateral position of a seismic source array relative to a seismic vessel. Although two gas dispensing tubes are shown in FIGS. 1 and 2, more or less than two tubes may be used in practicing the invention. Preferably, the position of tubes 5 and 6 is generally fixed relative to streamer 4 during seismic data gathering operations.

Tubes 5 and 6 each have an open end connected to a supply of compressed gas (not shown) aboard seismic vessel 1. Tube 5 preferably has a closed end adjacent paravane 9 and tube 6 preferably has a closed end adjacent paravane 10. Compressed gas is caused to flow into the open end of tube 5 and the open end of tube 6. The gas escapes in the form of bubbles through the perforations in tubes 5 and 6. Due to their buoyancy the bubbles will rise toward surface 11. As seismic vessel 1 tows tubes 5 and 6 through body of water 8, zone 7, containing a mixture of water and gas bubbles, is produced. The boundaries of zone 7 include surface 11, the surfaces represented by dashed lines 14 and 15 (shown in FIG. 1) and the surface represented by dashed line 16 (shown in FIG. 2). The surface represented by dashed line 16 is shown oriented at an acute angle relative to surface 11, since the surface represents the average positions of the slowest rising bubbles emitted from tubes 5 and 6. The distance between surface 11 and such slowest rising bubbles will decrease with time due to the bubbles' buoyancy. The bubbles shown at the right of zone 7 in FIG. 2 therefore would have been emitted prior to those shown at the left of zone 7 in FIG. 2.

Figure 3:
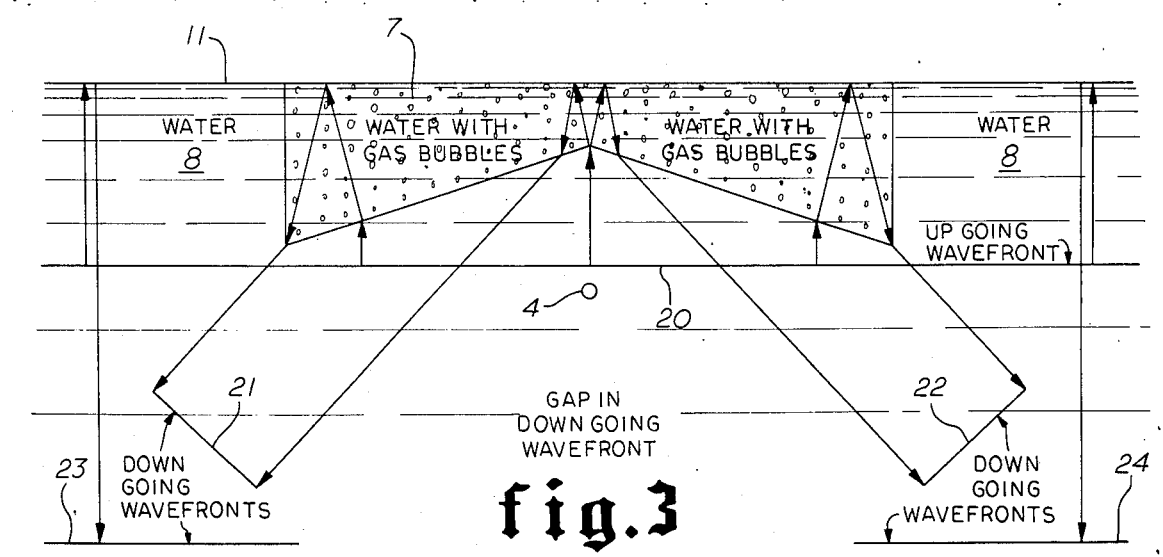
FIG. 3 is a sectional view, taken in a plane perpendicular to the seismic streamer axis, illustrating schematically the manner in which the acoustic lens of the present invention redirects acoustic waves incident thereon.

Zone 7 should be shaped and sized so that it refracts upward-traveling acoustic waves reflected from formation 13 or floor 12 so as to direct their re-reflections from surface 11 away from the hydrophones of streamer 4, and thus reduce the amount of reverberating noise incident on the hydrophones of streamer 4. The preferred shape for zone 7 is shown in FIGS. 1, 2, and 3, and may be understood most easily with reference to FIG. 3. FIG. 3 shows a cross-sectional view of zone 7 of FIG. 1, taken on a plane perpendicular to the axis of streamer 4.

The presence of a plurality of fine air bubbles in zone 7 causes the compressibility of zone 7 and the velocity of sound in zone 7 to be reduced below their values in body of water 8 outside zone 7. (See E. Silberman, "Sound Velocity and Attenuation in Bubbly Mixtures Measured in Standing Wave Tubes," 29 Journal of Acoustical Society of America, pp.925–933 for a discussion of the acoustic properties of a water-air bubble mixture.) Thus, incident acoustic waves will be refracted by zone 7, which acts as an acoustic lens to change the direction of their wave fronts as indicated in FIG. 3.

As shown in FIG. 3, the upward-traveling acoustic wave having planar wave front 20 will be detected by one or more of the hydrophones in streamer 4. The portion of wavefront 20 passing through the lower edge of zone 7 will be refracted in such a manner that it will not perpendicularly contact surface 11. That portion of wave front 20 will reflect from surface 11 and, after emerging from zone 7, will propagate generally downward as downward-traveling wavefronts 21 and 22. The portions of wavefront 20 not in contact with zone 7 may reflect perpendicularly from surface 11 so as to propagate downward as wavefronts 23 and 24. Thus, as shown by the diagram in FIG. 3, a gap in the acoustic radiation reflected from surface 11 is generated beneath zone 7. Streamer 4 is towed in this gap and the seismic signal intercepted by the hydrophones has a significantly reduced noise event caused by acoustic radiation reflected from surface 11.

Zone 7 is preferably shaped as shown in FIG. 3. This shape may be achieved by symmetrically positioning tubes 5 and 6 generally above and on opposite sides of streamer 4, so that tubes 5 and 6 define the equal sides of an upward-pointing isosceles triangle in a plane substantially perpendicular to the axis of streamer 4. Alternately, the surface of zone 7 opposite surface 11 (the "bottom surface") may be generally concave-shapd, or otherwise shaped so that the thickness of zone 7 (the distance between surface 11 and the bottom surface) increases with increasing lateral distance away from streamer 4.

Zone 7 should be at least about 150 meters wide to affect enough of the upward-traveling wavefronts (such as wavefront 20) so as to be effective. Where the width of zone 7 (the distance between dashed lines 14 and 15 in FIG. 1) is 150 meters, a satisfactory range of values for the maximum zone thickness (the distance between surface 11 and paravane 9) is from about 15 meters to about 45 meters. Zone 7 will be effective even if no gas bubbles are introduced into the region directly above streamer 4. It is preferred, however, that gas bubbles are introduced into the region directly above streamer 4.

The acoustic properties of zone 7 also depend on the mean diameter of the gas bubbles therein and on the ratio of the volume of gas bubbles to the volume of water therein. It is desirable that the gas bubbles in zone 7 have a mean diameter of about 0.1 millimeter. Such desired means bubble diameter may be achieved by using gas tubes 5 and 6 having appropriately sized perforations. It is preferred that the ratio of the volume of gas bubbles to that of water in zone 7 exceed about 0.0002, and be substantially less than 1. Such preferred volume ratio may be achieved by appropriately selecting the gas pressure and flow rate in gas tubes 5 and 6.

The above description is merely illustrative of the present invention. Various changes in shapes, sizes, materials, or other details of method and construction may be within the scope of the appended claims without departing from the spirit of the invention.

I claim as my invention:

1. Apparatus for use in gathering seismic data in an area covered by a body of water having a surface, comprising:
   a seismic vessel;
   a seismic source towed by the seismic vessel for generating in the body of water an acoustic wave which will penetrate to and be reflected from at least one reflective horizon located below the body of water;
   a streamer towed by the seismic vessel in the body of water below its surface, including at least one hydrophone for detecting the acoustic wave reflected from said at least one reflective horizon;
   a first gas dispensing tube and a second gas dispensing tube disposed in the water adjacent said vessel, said tubes each having a side wall and a plurality of perforations through said side wall for permitting gas bubbles to escape into the water;
   a first paravane attached to said first tube;
   a second paravane attached to said second tube; and
   control means connected to the first paravane and to the second paravane for controlling the position of said paravanes relative to the streamer so that gas bubbles escaping from said first tube and said second tube occupy a zone of water so as to form an acoustic lens located so that the acoustic wave reflected from said at least one reflective horizon will be refracted in the zone so as to reduce the intensity of noise incident on said at least one hydrophone due to the re-reflection of the acoustic wave from the surface of the body of water, said zone having a bottom surface facing said streamer shaped so that the distance between the surface of the body of water and the bottom surface of the zone increases with increasing distance from the axis of the streamer.

2. The apparatus of claim 1 further comprising a compressed gas source disposed on the seismic vessel adapted to supply compressed gas to said first and second tubes.

3. The apparatus of claim 2 wherein the perforations through the side wall of the first tube and the side wall of the second tube are sized so that the mean diameter of gas bubbles escaping therethrough into the zone is about 0.1 millimeters.

* * * * *